US008312292B2

(12) United States Patent
Owens et al.

(10) Patent No.: US 8,312,292 B2
(45) Date of Patent: Nov. 13, 2012

(54) INPUT OUTPUT ACCESS CONTROLLER

(75) Inventors: John R. Owens, Carlsbad, CA (US);
John C. Andolina, Vista, CA (US);
Stuart N. Shanken, San Diego, CA
(US); Richard L. Quintana, Carlsbad,
CA (US)

(73) Assignee: ViaSat, Inc., Carlsbad, CA (US)

( * ) Notice: Subject to any disclaimer, the term of this patent is extended or adjusted under 35 U.S.C. 154(b) by 898 days.

(21) Appl. No.: 12/184,079

(22) Filed: Jul. 31, 2008

(65) Prior Publication Data

US 2009/0037631 A1 Feb. 5, 2009

Related U.S. Application Data

(60) Provisional application No. 60/962,821, filed on Jul. 31, 2007, provisional application No. 60/962,822, filed on Jul. 31, 2007, provisional application No. 60/962,848, filed on Jul. 31, 2007, provisional application No. 61/026,438, filed on Feb. 5, 2008.

(51) Int. Cl.
*G06F 21/00* (2006.01)
*G06F 13/00* (2006.01)
*G06F 13/28* (2006.01)
*G06F 15/173* (2006.01)
*H04L 29/06* (2006.01)

(52) U.S. Cl. ............ 713/189; 726/1; 711/100; 711/163; 709/223; 709/224; 709/225; 709/226

(58) Field of Classification Search ................... 713/189; 726/1; 709/223–226; 711/100, 163
See application file for complete search history.

(56) References Cited

U.S. PATENT DOCUMENTS

| 4,442,484 | A | * | 4/1984 | Childs et al. ................. 711/163 |
| 4,683,532 | A | | 7/1987 | Yount et al. |
| 5,495,533 | A | | 2/1996 | Linehan et al. |
| 5,905,725 | A | | 5/1999 | Sindhu et al. |
| 5,991,519 | A | | 11/1999 | Benhammou et al. |
| 6,408,001 | B1 | | 6/2002 | Chuah et al. |
| 6,604,147 | B1 | | 8/2003 | Woo |
| 6,704,871 | B1 | * | 3/2004 | Kaplan et al. ................. 713/192 |
| 6,751,729 | B1 | | 6/2004 | Giniger et al. |

(Continued)

FOREIGN PATENT DOCUMENTS

EP 0876026 A2 11/1998

(Continued)

OTHER PUBLICATIONS

Cohen, Gary N., et al. "A New Capability for Creation of MLS ATM LANS and WANS", *MILCOM 97 Proceedings* Monterey, CA, Nov. 2-5, 1997, New York, NY; *IEEE* (1997) vol. 3: 1412-1416.

(Continued)

*Primary Examiner* — Catherine Thiaw
(74) *Attorney, Agent, or Firm* — Kilpatrick Townsend & Stockton LLP (57) ABSTRACT

A device for high-assurance processing is disclosed. A processing circuit uses an access controller to assure that the processing circuit operates properly. The processing circuit runs software programs and is programmable. The access controller is programmable, but not programmable by the processing circuit. Peripherals or segments of the address space of the processing circuit is regulated. In a particular state, the peripherals that are available are regulated by the access controller. In some embodiments, the transition from state-to-state can also be regulated by the access controller.

16 Claims, 6 Drawing Sheets

U.S. PATENT DOCUMENTS

| | | | |
|---|---|---|---|
| 6,836,548 B1 | 12/2004 | Anderson | |
| 6,854,061 B2 | 2/2005 | Cooper et al. | |
| 7,055,029 B2* | 5/2006 | Collins et al. | 713/161 |
| 7,089,419 B2* | 8/2006 | Foster et al. | 713/166 |
| 7,213,147 B2 | 5/2007 | Tuvell et al. | |
| 7,274,696 B1 | 9/2007 | Sikdar | |
| 7,322,042 B2* | 1/2008 | Srinivasan et al. | 726/17 |
| 7,356,147 B2 | 4/2008 | Foster et al. | |
| 7,441,262 B2 | 10/2008 | Hui et al. | |
| 7,636,858 B2* | 12/2009 | Khan et al. | 713/189 |
| 7,660,986 B1 | 2/2010 | Qiu et al. | |
| 7,715,565 B2 | 5/2010 | Kimmel et al. | |
| 7,764,672 B2 | 7/2010 | Moriwaki | |
| 7,773,754 B2 | 8/2010 | Buer et al. | |
| 7,774,619 B2* | 8/2010 | Paaske et al. | 713/191 |
| 2003/0084309 A1* | 5/2003 | Kohn | 713/189 |
| 2004/0008685 A1 | 1/2004 | Yamano et al. | |
| 2004/0024980 A1* | 2/2004 | Scott et al. | 711/163 |
| 2004/0066781 A1 | 4/2004 | Shankar et al. | |
| 2004/0258062 A1 | 12/2004 | Narvaez | |
| 2005/0031119 A1 | 2/2005 | Ding | |
| 2005/0044252 A1 | 2/2005 | Floyd et al. | |
| 2005/0094643 A1 | 5/2005 | Wang et al. | |
| 2005/0102546 A1* | 5/2005 | Patchen et al. | 713/500 |
| 2005/0198412 A1 | 9/2005 | Pedersen et al. | |
| 2005/0278549 A1* | 12/2005 | Torla et al. | 713/189 |
| 2006/0039335 A1 | 2/2006 | Ono et al. | |
| 2006/0075311 A1 | 4/2006 | Ranjan et al. | |
| 2006/0114914 A1 | 6/2006 | Anand et al. | |
| 2006/0146706 A1 | 7/2006 | Nielsen | |
| 2006/0174319 A1* | 8/2006 | Kraemer et al. | 726/1 |
| 2006/0190987 A1* | 8/2006 | Ohta et al. | 726/1 |
| 2006/0251078 A1 | 11/2006 | Shin et al. | |
| 2006/0294596 A1* | 12/2006 | Govindarajan et al. | 726/27 |
| 2007/0014399 A1 | 1/2007 | Scheidt et al. | |
| 2007/0067826 A1* | 3/2007 | Conti | 726/2 |
| 2007/0101142 A1 | 5/2007 | Suzuki | |
| 2007/0110069 A1 | 5/2007 | Lim et al. | |
| 2007/0130458 A1 | 6/2007 | Focke et al. | |
| 2007/0156987 A1* | 7/2007 | Chen et al. | 711/163 |
| 2007/0156999 A1* | 7/2007 | Durham et al. | 711/170 |
| 2007/0157287 A1* | 7/2007 | Lim | 726/1 |
| 2007/0220500 A1* | 9/2007 | Saunier | 717/162 |
| 2007/0226493 A1* | 9/2007 | O'Brien et al. | 713/166 |
| 2007/0226795 A1* | 9/2007 | Conti et al. | 726/22 |
| 2007/0250904 A1 | 10/2007 | Waller | |
| 2008/0019358 A1 | 1/2008 | Rijsman | |
| 2008/0077794 A1* | 3/2008 | Arnold et al. | 713/169 |
| 2008/0130534 A1 | 6/2008 | Tomioka | |
| 2008/0215897 A1 | 9/2008 | Doyle et al. | |
| 2009/0034734 A1 | 2/2009 | Owens et al. | |
| 2009/0158050 A1 | 6/2009 | Quintana et al. | |
| 2009/0214044 A1 | 8/2009 | Kinoshita | |
| 2009/0249080 A1* | 10/2009 | Zhang et al. | 713/187 |
| 2009/0282263 A1* | 11/2009 | Khan et al. | 713/189 |
| 2010/0008499 A1 | 1/2010 | Lee et al. | |

FOREIGN PATENT DOCUMENTS

| | | |
|---|---|---|
| EP | 1132801 A2 | 9/2001 |
| EP | 1326157 A2 | 7/2003 |
| WO | WO2007/006001 A | 1/2007 |
| WO | WO2007/006014 A | 1/2007 |
| WO | WO 2009/018479 A1 | 2/2009 |
| WO | WO 2009/018481 A1 | 2/2009 |
| WO | WO 2009/018483 A1 | 2/2009 |
| WO | WO 2009/018479 A4 | 4/2009 |

OTHER PUBLICATIONS

International Search Report of Dec. 23, 2008 for PCT Patent Application No. PCT/US2008/071818, 3 pages.

International Preliminary Report on Patentability of Feb. 2, 2010 for PCT Patent Application No. PCT/US2008/071818 with Written Opinion, 8 pages.

International Search Report of Oct. 29, 2008 for PCT Patent Application No. PCT/US2008/071821, 3 pages.

International Preliminary Report on Patentability of Feb. 2, 2010 for PCT Patent Application No. PCT/US2008/071821 with Written Opinion, 9 pages.

International Search Report of Nov. 5, 2008 for PCT Patent Application No. PCT/US2007/071823, 3 pages.

International Preliminary Report on Patentability of Feb. 2, 2010 for PCT Patent Application No. PCT/US2008/071823 with Written Opinion , 8 pages.

Non-Final Office Action of Aug. 2, 2011 for U.S. Appl. No. 12/184,062, 26 pages.

Non-Final Office Action of Jun. 21, 2011 for U.S. Appl. No. 12/184,048, 33 pages.

Final Office Action of Jan. 12, 2012 for U.S. Appl. No. 12/184,062, 35 pages.

Final Office Action of Jan. 4, 2012 for U.S. Appl. No. 12/184,048, 35 pages.

* cited by examiner

INPUT OUTPUT ACCESS CONTROLLER

This application claims the benefit of and is a non-provisional of co-pending: U.S. Provisional Application Ser. No. 60/962,848 filed on Jul. 31, 2007; U.S. Provisional Application Ser. No. 61/026,438 filed on Feb. 5, 2008; U.S. Provisional Application Ser. No. 60/962,821 filed on Jul. 31, 2007; and U.S. Provisional Application Ser. No. 60/962,822 filed on Jul. 31, 2007; which are all hereby expressly incorporated by reference in their entirety for all purposes.

This application expressly incorporates by reference: U.S. application Ser. No. 12/184,048, filed on Jul. 31, 2008, entitled "TRUSTED LABELER"; and, U.S. application Ser. No. 12/184,062, filed on Jul. 31, 2008, entitled "MULTI-LEVEL KEY MANAGER"; in their entirety for all purposes.

BACKGROUND

This disclosure relates in general to secure computing systems and, more specifically to address space control amongst other things.

Conventional programmable computing systems allow programs to access the address space with few controls. All memory and ports are mapped into the address space. Programs may be limited to a certain range of address space using a memory management unit (MMU). MMU functions include translation of virtual addresses to physical addresses (i.e., virtual memory management), memory protection, cache control, bus arbitration, and, possibly, bank switching. The control features of the MMU are reprogrammable in software.

The MMU signals errors to the operating system. Errors could include page faults that indicate access to a segment of memory not currently assigned. The operating system can assign different memory space. The processor running the operating system is required to be in stable operation if the MMU is expected to operate properly. If the processor begins to malfunction, the MMU could be reprogrammed.

Hackers are known to exploit operating systems despite conventional controls such as a MMU. Buffer overflows are a common technique to exploit programmable processors. Once the buffer overflow is exploited, a hacker can insert malicious code that takes over the operating system in some way. Gaming systems and smart phones have often been co-opted using this technique in order to run unauthorized third party applications.

Any software control of a processor is susceptible to hacking, crashing and other anomalous behavior. It is the nature of software to be unstable at times. Processors are complex and can suffer lock-ups. Every computer user is familiar with their computer locking and requiring a reset or power down to get the computer operating properly. For certain applications, such vulnerability is unacceptable even though the flexibility of using a computer is desirable.

SUMMARY

In an embodiment, a cryptographic device for high-assurance processing is disclosed. A processing circuit uses an access controller to assure that the processing circuit operates properly. The processing circuit runs software programs and is programmable. The access controller is programmable, but not programmable by the processing circuit. Peripherals or segments of the address space of the processing circuit is regulated. In a particular state, the peripherals that are available are regulated by the access controller. In some embodiments, the transition from state-to-state can also be regulated by the access controller.

In one embodiment, a cryptographic device for processing classified information having a number of different classification levels is disclosed. The cryptographic device includes a processing circuit and an access controller. The processing circuit for running software that is configured to access a number of peripherals. The access controller has access to a number of rules for a number of states. The number of rules regulate interaction with the number of peripherals. A first subset of the number of rules is used by the access controller in a first state. A second subset of the number of rules is used by the access controller in a second state. The access controller is not programmable by the processing circuit.

In another embodiment, a high-security device for processing information is disclosed. The high-security device includes a processing circuit and an access controller. The processing circuit executes software programs and is configured to access a number of peripherals. The access controller prevents unauthorized use of a number of address ranges. The access controller has access to a number of rules for a number of states. The number of rules regulate interaction with the number of address ranges. A first subset of the number of rules is used by the access controller in a first state. A second subset of the number of rules is used by the access controller in a second state. The access controller is not programmable by the processing circuit. The number of rules cannot be changed during operation of the high-security device.

In yet another embodiment, a method for enforcing rules in a processing circuit configured to run software programs is disclosed. In one step, software is run on a processing circuit. A first rule associated with a first state and a first number of addresses accessible while processing in the first state are determined. Violation of the first rule are reported when the processing circuit accesses an address outside the first number of addresses while in the first state. A second rule associated with a second state and a next state that can be transitioned to when exiting the second state are determined. Violation of the second rule is reported when the processing circuit exits from the second state to a state other than the next state.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
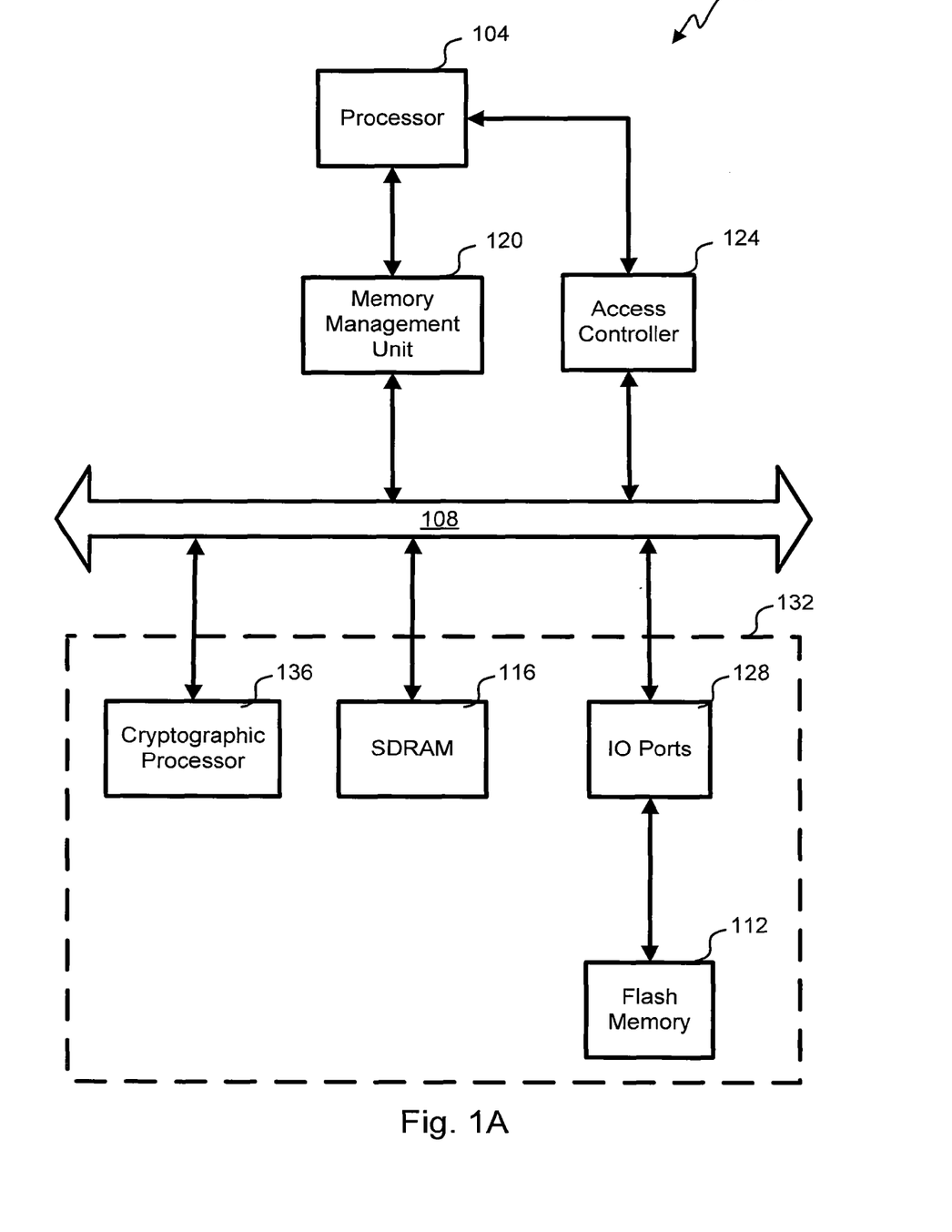
FIGS. 1A, 1B and 1C depict block diagrams of embodiments of a high-assurance circuits.

Referring first to FIG. 1A, a block diagram of an embodiment of a cryptographic circuit 100-1 is shown. The cryptographic circuit 100-1 would normally be susceptible to corrupted operation despite the protection provided by a memory management unit (MMU) 120. An access controller 124 provides protection against corrupted operation of a processor 104 in one embodiment. Any number of things can cause corrupted operation, for example, metastability, failure of logic circuits, hacking, etc.

The processor 104 performs programmable operations in the cryptographic circuit 100 in a controlled manner. Software program execution proceeds on the processor 104 through a number of defined states expressed to the access controller 124 who then observes that only allowed peripherals are accessed during that state. Table I shows some of the peripherals and the address ranges that are assigned to them. Peripherals are anything mapped to the address space of the processor 104. For example, First Data Input Registers are accessible with addresses 00000000h through 0000000Fh in this embodiment.

TABLE I

Excerpt of Peripheral Address Ranges

| Peripheral | Minimum Address | Maximum Address | Comments |
|---|---|---|---|
| 0 | 00000000 | 0000000F | First Data Input Registers |
| 1 | 00000010 | 0000001F | Second Data Input Registers |
| 2 | 00000020 | 0000002F | Third Data Input Registers |
| 3 | 00000030 | 0000003F | First Data Output Registers |
| 4 | 00000040 | 0000004F | Second Data Output Registers |
| 5 | 00000050 | 0000005F | Third Data Output Registers |
| 6 | 01000000 | 011FFFF | SDRAM Partition 1 |
| 7 | 01200000 | 013FFFF | SDRAM Partition 2 |
| 8 | 01400000 | 015FFFF | SDRAM Partition 3 |
| 9 | 01600000 | 016FFFF | Memory Management Unit |
| 10 | 01700000 | 019FFFF | Key Memory |

In addition to monitoring that the proper addresses are accessed for each peripheral, the access controller 124 is aware of the valid state transitions and assures that the processor 104 progresses through valid state transitions. The allowed transitions, for example, a transition into states two or three can be made from state one in this embodiment. Table II shows some of the valid state transitions in this embodiment. Prior to entry into a particular state, the processor communicates that next state to the access controller 124 for checking. Should the processor 104 begin acting improperly, the states will not correspond to the associated peripherals and remedial action is taken.

TABLE II

Excerpt of Valid State Transitions

| From State | To State |
|---|---|
| 0 | 1 |
| 0 | 5 |
| 0 | 14 |
| 1 | 2 |
| 1 | 3 |
| 2 | 4 |
| 2 | 14 |
| 3 | 6 |
| 3 | 4 |
| 4 | 7 |
| 4 | 8 |

The access controller 124 knows which peripherals can be read or written in each state. If the software accesses a disallowed peripheral or attempts an operation that is not allowed with that peripheral, remedial action is taken. For example, some or all keys could be erased or zeroized, one or more circuits could erase themselves, the cryptographic circuit 100 could self-destruct, the processor 104 could be reset, memory could be erased or zeroized, and/or the processor 104 could be diverted to a known state. Table III shows the valid peripherals for some of the states in one embodiment. The fourth state, as an example, can read from the third peripheral and can both read from and write to the fourth peripheral.

TABLE III

Excerpt of Valid Peripherals for States

| State | Peripherals (R = Read, W = Write) |
|---|---|
| 0 | 0R |
| 1 | 1RW |
| 2 | 1RW, 2R, 3W |
| 3 | 2RW, 7R, 8W |
| 4 | 3R, 4RW |
| 5 | 9W |
| 6 | 9W, 10RW |
| 7 | 5R |
| 8 | 6RW |
| 9 | 0W, 5R |
| 10 | 6R, 10RW |

The access controller 124 is not programmable after design of the cryptographic circuit 100 in this embodiment. Changes can be made to the programming of the access controller after fielding of the cryptographic circuit 100. In no event is the processor 104 able to program how the access controller 124 operates during normal operation. By limiting the input to the access controller, this embodiment is more secure. The access controller 124 includes a state machine in this embodiment that uses look-up tables for the programming. Other embodiments could use a processor in the access controller.

The access controller 124 can observe actions taken on a bus 108. Through these observations, the access controller 124 can determine if the processor 104 is operating properly. In some cases, the access controller 124 is fast enough to prevent prohibited peripheral information to get to the processor 104. For some peripherals, the access controller 124 isn't fast enough to prevent prohibited information from reaching the processor, but that information is withdrawn as part of the remedial measures. Remedial measures could include, for example, system level reset, system level shutdown and system level erasure, key deletions, and/or data deletions.

This embodiment includes a MMU 120 that aids in setting-up virtual addressing. The software on the processor 104 configures the MMU 120. The processor 104 is at liberty to change the program of the MMU 120 such that a misbehaving processor 104 can destroy any protection the MMU 120 provides.

A bus 108 is used to allow communication of various blocks in the cryptographic circuit 100. Generally, information passes through the processor 104 when travelling across the bus 108, but some embodiments allow direct memory access (DMA) to lessen the involvement of the processor 104 during information transfers on the bus 108. The access controller 124 can monitor DMA operation in the states that use that function to avoid prohibited operation. The MMU 120, the access controller 124, a cryptographic processor 136, synchronous dynamic random access memory (SDRAM) 116, and input/output (IO) ports 128 are all coupled directly to the bus.

Flash memory 112 is not directly coupled to the bus 108, but information can be passed through the IO ports 128. The flash memory 112 is passed information and returns information through the IO ports 128. The IO ports 128 perform protocol and interface translations such that any function can interface to the bus 108. Any number of function blocks could be coupled to the IO ports 128 in various embodiments to send and receive information with the bus 108.

Figure 1B:
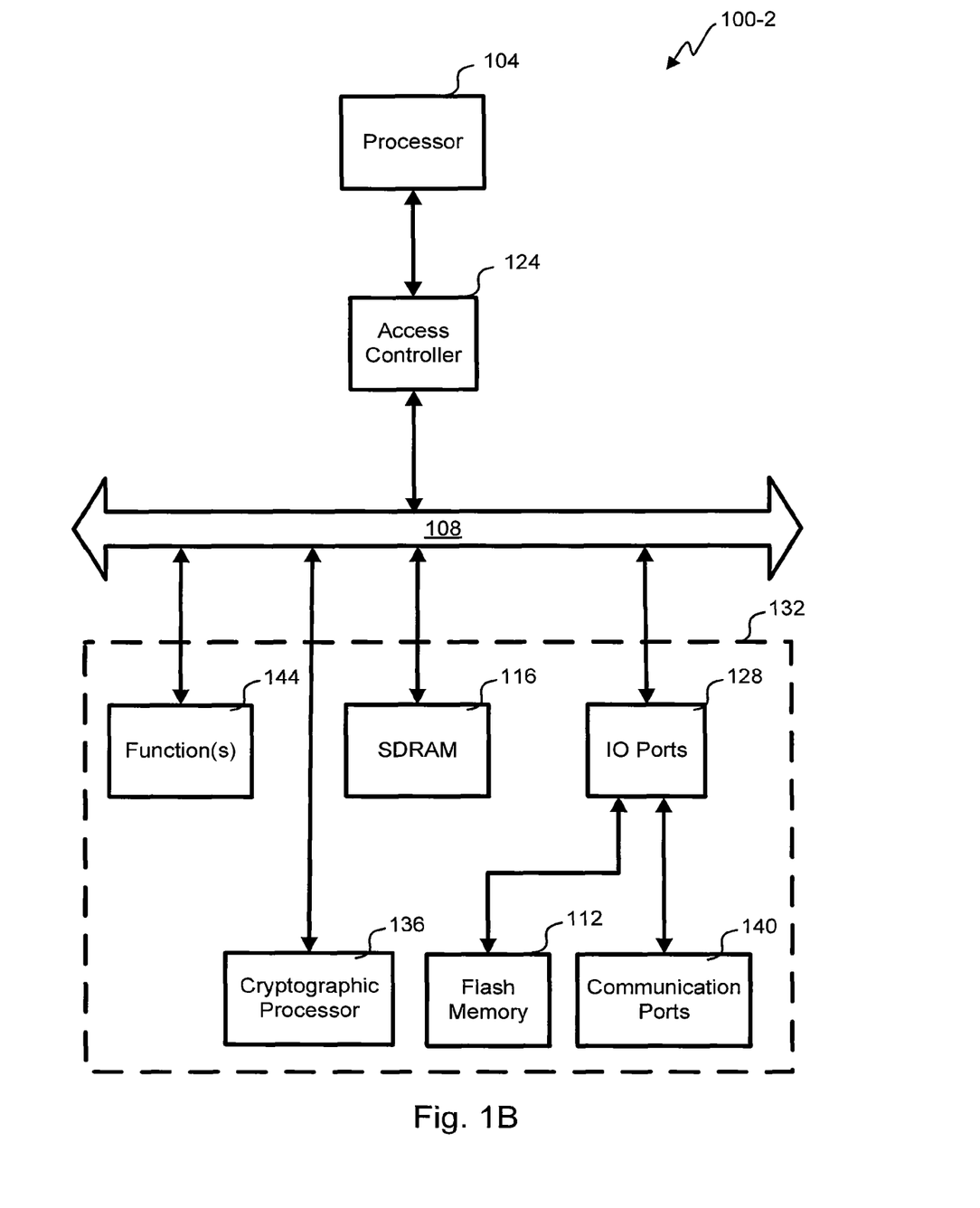

With reference to FIG. 1B, a block diagram of another embodiment of a cryptographic circuit 100-2 is shown. This embodiment differs from the embodiment of FIG. 1A in that there is no MMU, the access controller 124 is situated between the processor 104 and the bus 108, and the IO ports 128 service communication ports 140 in addition to the flash memory 112. Additionally, a function(s) block is directly coupled to the bus 108 to illustrate the point that other functions can be added to the cryptographic circuit 100 in this manner. As mentioned above, the IO ports 128 can support interfacing any number of functional blocks to the bus 108. Here, there are flash memory 112 and communication ports 140, that are all mapped to addresses of the IO ports 128. The IO ports 128 are mapped to the address space of the processor 104. Any number of peripherals can be defined as sub-ranges in the address range allocated to the IO ports 128.

The access controller 124 is situated between the processor 104 and the bus 108 in this embodiment. The access controller 124 could block access to the bus when improper operation is sensed. Some embodiment could allow read or writes to occur even though improper, but would take remedial measures to return the processor 104 to stable operation.

Figure 1C:
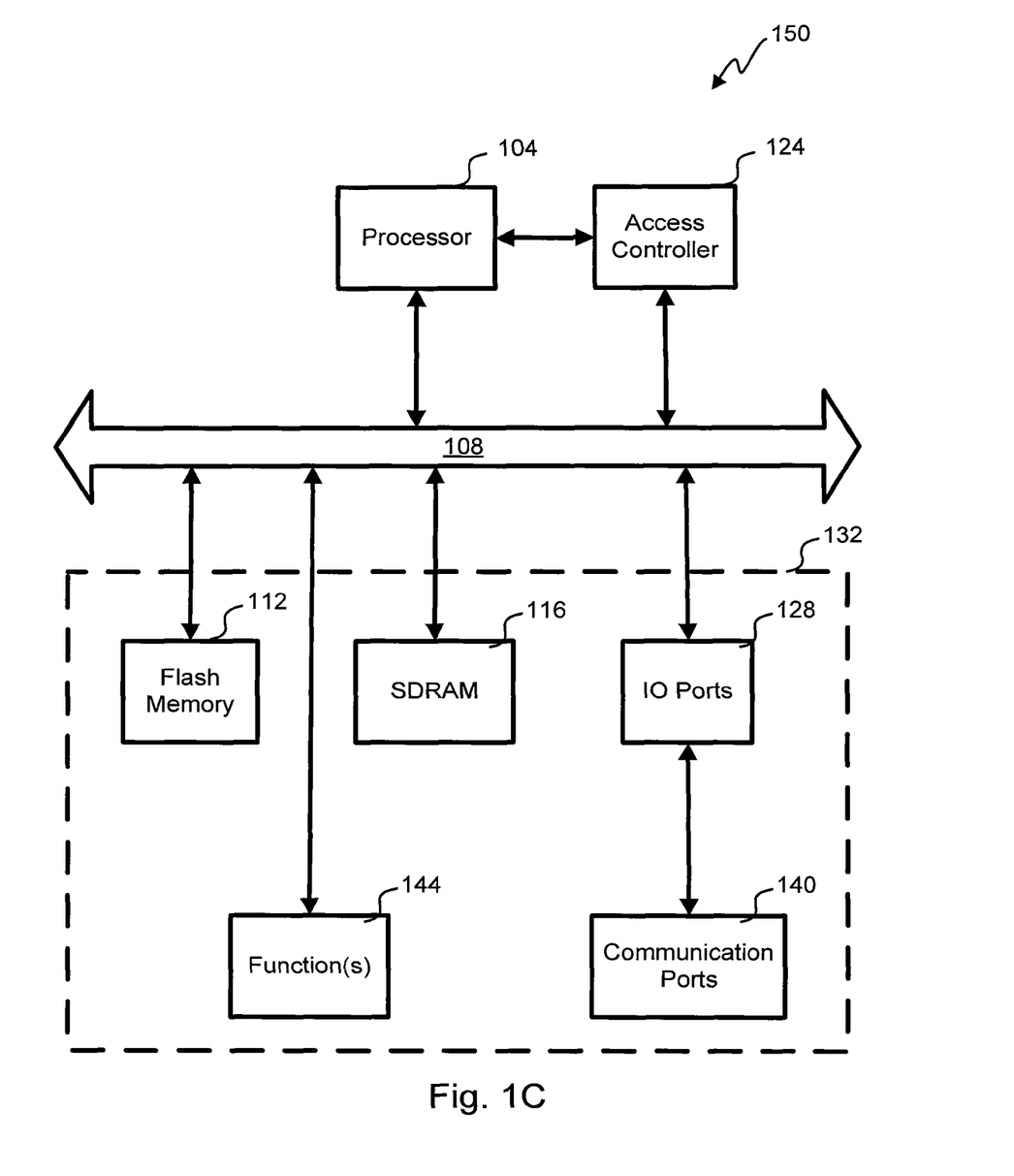

Referring next to FIG. 1C, a block diagram of an embodiment of a high-assurance circuit 150 is shown. This embodiment does not perform cryptographic processing, but benefits from the access controller 124. The high-assurance circuit 150 does not use a MMU and has the access controller 124 coupled to the bus 108. The processor 104 is directly coupled to the bus 108 in this embodiment. Rather than preventing an improper access before it results in data transfer in some cases, the access controller 124 monitors for the improper data transfer and takes remedial action. Coupled to the IO ports 128 are communication ports 140 in this embodiment. There are flash memory 112, function(s) 144, SDRAM 116, and IO ports 128 coupled directly to the bus 108.

Figure 2A:
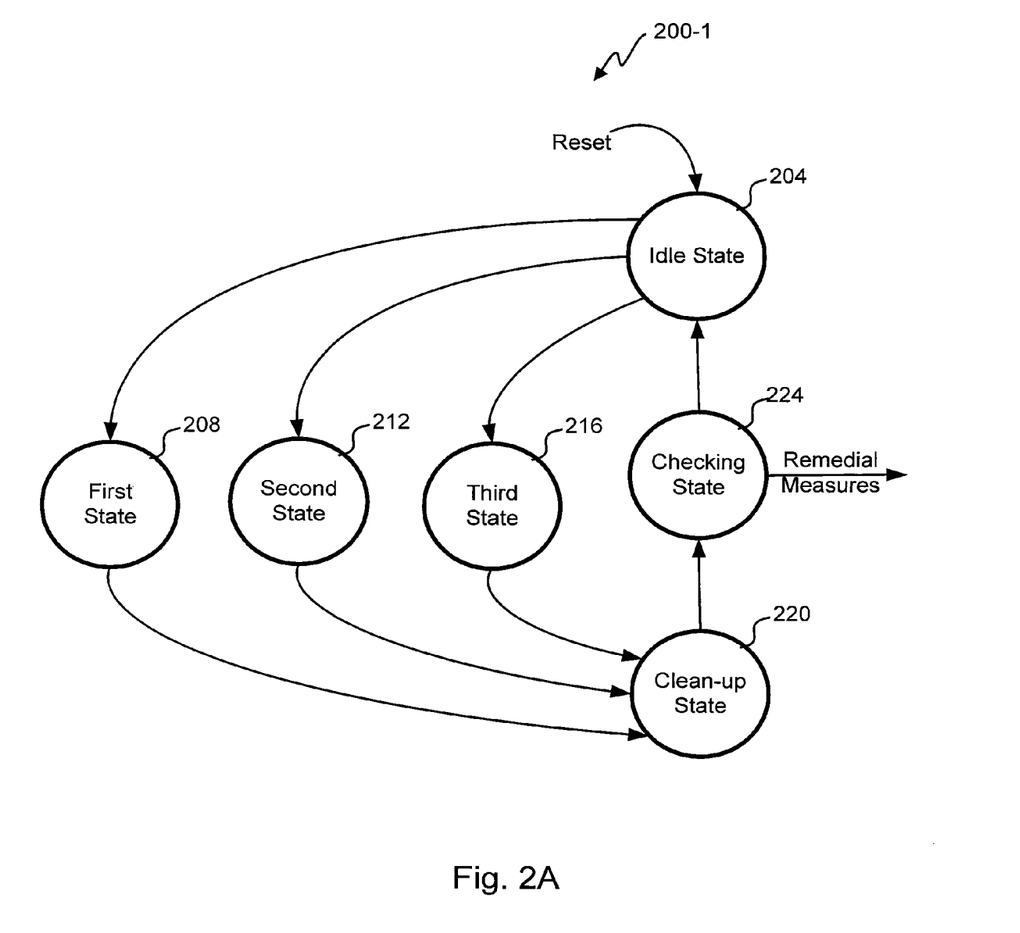
FIGS. 2A and 2B depict state diagrams that demonstrate how embodiments of the cryptographic circuit changes states.

With reference to FIG. 2A, a state diagram 200-1 demonstrates how an embodiment of the cryptographic or high-assurance circuit 100, 150 changes states. Each state is defined to the access controller 124 along with the valid states to transition to. Additionally, the peripherals or addresses in the address space are defined for each state for this embodiment. There is an express dialog from the software to the access controller 124 to communicate the desired next state. The software when operating properly follows this state diagram with the express indication of the next step, while the access controller 124 enforces that operation independently.

After resetting, the state machine begins in the idle state 204. Depending on various factors in the software, operation can go to any of the first, second or third states 208, 212, 216. When in one of the first, second or third states 208, 212, 216 operation would pass to a clean-up state 220 where various data, keys and other information are purged from memory. In this embodiment, the alternative states (i.e., the first, second or third states 208, 212, 216) process information that is inaccessible to other alternative states.

Once clean-up completes, an optional checking state 224 confirms that clean-up completed successfully. Presuming that happens, the operation goes back to the idle state 204. Where clean-up is not deemed successful in the checking state 224, remedial measures are taken.

Although not shown, the state machine can become violated by the software. Where an error condition in the processor 104 causes invalid state transitions or access to peripherals that are not allowed, the access controller 124 forces the processor 104 into states that take remedial action. For example, these errors could force operation to the clean-up state 220 or even force a reset.

Figure 2B:
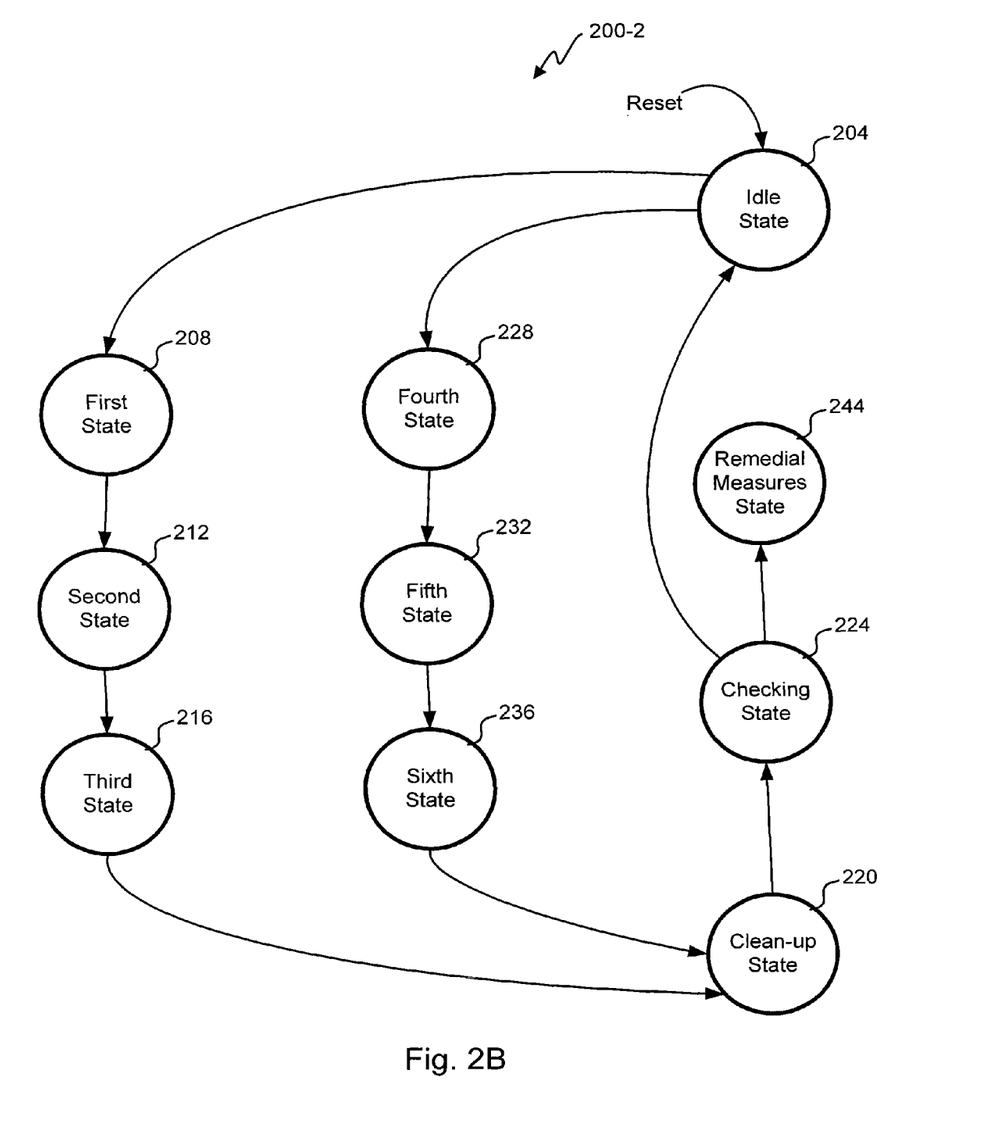

Referring next to FIG. 2B, a state diagram 200-2 demonstrates how an embodiment of the cryptographic or high-assurance circuit 100, 150 changes states. In this embodiment, operation passes from the idle state 204 down two alternative paths that have a number of states. In one path, there is a first, second and third states 208, 212, 216 configured in a serial fashion. Along the other path, there is a fourth, fifth and sixth states 228, 232, 236 configured in a serial fashion that doesn't allow reversing or changing path. Although only three states are shown in each path, other embodiments could have any number of states. Both paths in this embodiment have the same number of states, but the paths need not be symmetric in this way.

Regardless of path, processing transitions from either the third or sixth states 216, 236 to the clean-up state 220. Operation passes from the clean-up state 220 to the checking state 224 to test that the clean-up was performed properly. Other self testing could be performed in the checking state 224. The testing could be performed by the processor 104 with the access controller 124 checking that the testing is performed properly. Where the checking finds no errors, operation passes to the idle state 204.

Where testing fails, operation transitions to a remedial measures state 244. Clearing of keys and other information can be performed in the remedial measures state 244. Operation of the cryptographic or high-assurance circuit 100, 150 could be temporarily or permanently disabled. In this embodiment, the idle state 204 is not reached so operation temporarily or permanently is halted. Loading of new keys or other intervention could reset operation back to the idle state 204.

Figure 3:
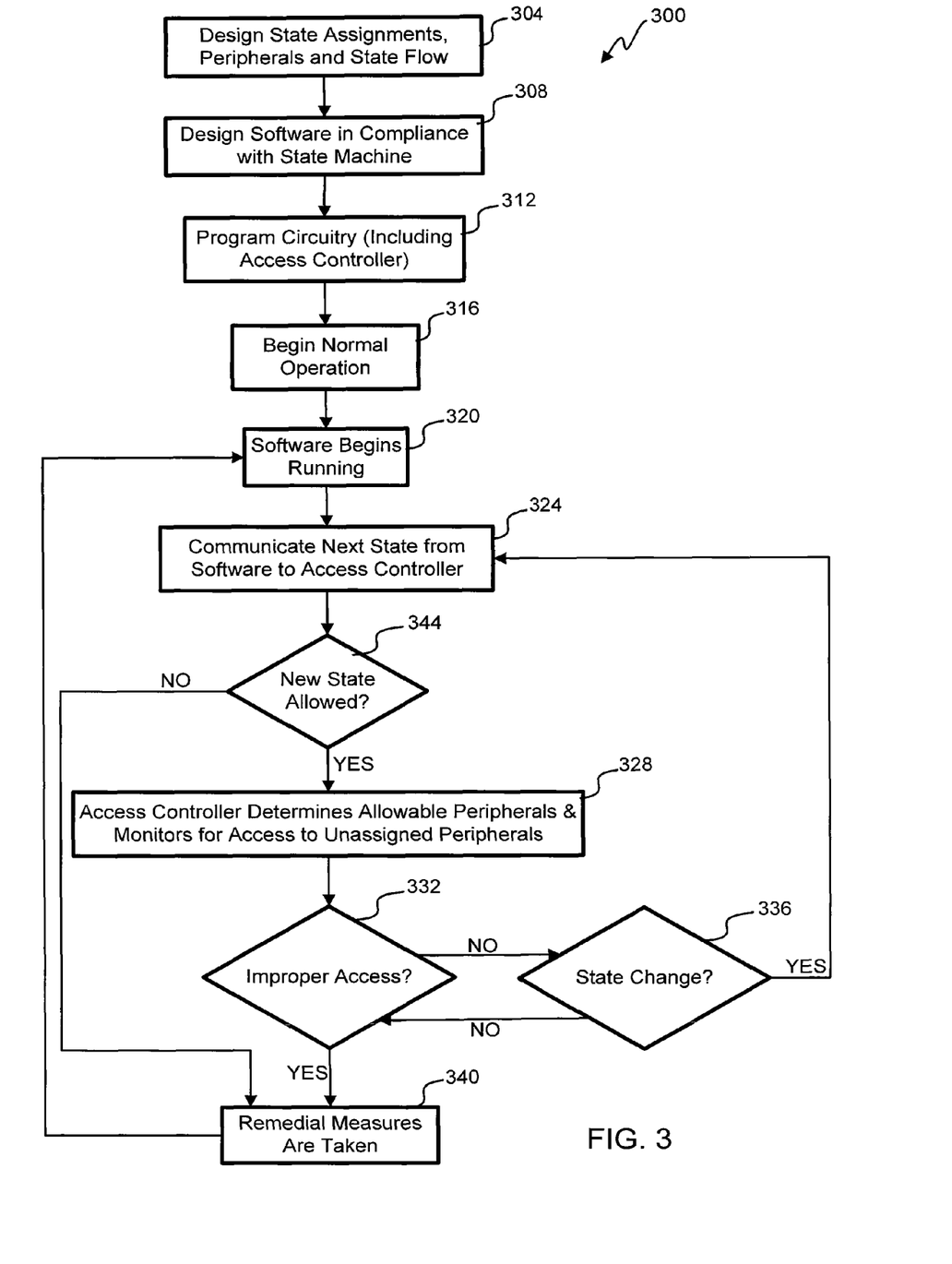
FIG. 3 illustrates a flowchart of an embodiment of a process for operating the cryptographic circuit.

With reference to FIG. 3, a flowchart of an embodiment of a process 300 for operating the cryptographic or high-assurance circuit 100, 150 is shown. The depicted portion of the process begins in block 304 where design of the software is performed. The operation of the software plan is broken up into any number of states and mapped to peripherals. Since the peripherals are addresses ranges, any granularity of the address space can be designed. Peripherals can be as small as a single address or as large as desired. In this embodiment, there are at least two peripherals in the address space.

In block 308, the software is designed in compliance with the design performed in block 304. Some design flows in other embodiments could develop the software prior to the design of the state machine. The granularity of the states could be increased or decreased depending on the level of assurance desired.

The cryptographic or high-assurance circuit 100, 150 is programmed at some point in block 312. This could involve programming of configurable logic and recording software in non-volatile memory. In this embodiment, the access controller 124 is embodied in a field programmable gate array (FPGA) at the time that the cryptographic or high-assurance circuit 100, 150 is manufactured. The states, peripherals and state transitions are all locked at that point. Some embodiments allow reprogramming of the access controller 124, but not during operation of the cryptographic or high-assurance circuit 100, 150 with the processor 104. In this way, the functionality of the access controller 124 operates independently of the processor.

At some point, normal operation of the cryptographic or high-assurance circuit 100, 150 commences in block 316. The software begins running on the processor 104 in block 320. Reset of the cryptographic or high-assurance circuit 100, 150 will resume operation at block 320.

The software has an express dialog with access controller 124 as transition through each states occurs. In block 324, the next state is communicated from the processor 104 to the access controller 124. A determination in block 344 is made by the access controller 124 to confirm the next state from the software matches what the access controller 124 knows is an allowed state to transition to from the current state. Where there is a violation, processing goes from block 344 to block 340 where remedial measures can be taken.

In block 328, the access controller 124 determines the allowable peripherals and monitors for access to incorrect peripherals. A determination is made in block 332 as to whether there has been an attempt at improper access to peripherals that are not allowed in the current state. Processing passes to block 336 when the peripheral access was proper and to block 340 when it was improper. In block 340, the remedial measures state 244 is entered. Where the improper operation can be remedied processing goes from block 340 back to block 320 to being operation of the software again.

Where there has been no improper access to peripheral in block 332, processing continues to block 336 where a determination is made as to whether there has been a state change. If there is no state change, processing goes back to block 332. Where there is a state change, processing loops back from block 336 to block to 324 to prepare to move to the next state all over again.

A number of variations and modifications of the disclosed embodiments can also be used. For example, the above embodiments discuss use as a cryptographic circuit, but other embodiments may not be used in cryptographic systems. Embodiments could be used for secure or high-assurance processing.

While the principles of the disclosure have been described above in connection with specific apparatuses and methods, it is to be clearly understood that this description is made only by way of example and not as limitation on the scope of the disclosure.

What is claimed is:

1. A cryptographic device for processing classified information having a plurality of different classification levels, the cryptographic device comprising:
   a processing circuit configured to:
      access a plurality of peripherals, and
      execute software programs;
   an access controller, communicatively coupled to the processing circuit and configured to:
      access a plurality of rules which the access controller applies for a plurality of states of the processing circuit;
      regulate which of the plurality of states the processing circuit is allowed to transition to from each of the plurality of states, based on the plurality of rules, and
      take or request remedial action when at least one of the plurality of rules is violated while the processing circuit is in one of the plurality of states;
   wherein:
   the plurality of rules specify, for each of the plurality of states:
      which of the plurality of peripherals are allowed to be accessed by the processing circuit,
      which operations are allowed to be performed by the processing circuit with each of the plurality of peripherals accessible to the processing circuit, the operations including at least one of read, write, or read and write, and
      which of the plurality of states the processing circuit is allowed to transition to;
   the plurality of rules are not fixed;
   the plurality of rules may be changed, but cannot be changed:
      by the processing circuit, or
      during operation of the cryptographic device;
   the access controller is not programmable by the processing circuit; and
   the plurality of states comprise:
      an idle state;
      at least one operational state capable of being transitioned to from the idle state; and
      a clean-up state during which data is purged from memory, the clean-up state capable of being transitioned to by the processing circuit at least once after the processing circuit transitions from the at least one operational state and before the processing circuit transitions back to the idle state.

2. The cryptographic device for processing classified information having the plurality of different classification levels as recited in claim 1, wherein each peripheral is defined by an address range within address space of the processing circuit.

3. The cryptographic device for processing classified information having the plurality of different classification levels as recited in claim 1, wherein used portions of an address space of the processing circuit are divided among the plurality of peripherals.

4. The cryptographic device for processing classified information having the plurality of different classification levels as recited in claim 1, wherein the plurality of rules limits a first state to transitioning to a second state.

5. The cryptographic device for processing classified information having the plurality of different classification levels as recited in claim 1, wherein the plurality of rules limits a first state from transitioning to a second state.

6. The cryptographic device for processing classified information having the plurality of different classification levels as recited in claim 1, wherein:
   the plurality of rules limits a first state to an address range of a first peripheral, and
   the first peripheral is one of the plurality of peripherals.

7. The cryptographic device for processing classified information having the plurality of different classification levels as recited in claim 1, wherein violation of one of the plurality of rules interrupts normal operation of the processing circuit.

8. The cryptographic device for processing classified information having the plurality of different classification levels as recited in claim 1,
wherein:
the plurality of peripherals comprises a first peripheral and a second peripheral,
the first peripheral is limited to a first classification level associated with a first state,
the second peripheral is limited to a second classification level associated with a second state, and
data from the first classification level is kept separate from data from the second classification level using the plurality of rules.

9. A high-security device for processing information, the high-security device comprising:
a processing circuit configured to:
access a plurality of peripherals, and
execute software programs
an access controller to prevent unauthorized use of a plurality of address ranges, communicatively coupled to the processing circuit and configured to:
access a plurality of rules which the access controller applies for a plurality of states of the processing circuit;
regulate which of the plurality of states the processing circuit is allowed to transition to from each of the plurality of states, based on the plurality of rules, and
take or request remedial action when at least one of the plurality of rules is violated while the processing circuit is in one of the plurality of states;
wherein:
the plurality of rules specify, for each of the plurality of states:
which of the plurality of peripherals are allowed to be accessed by the processing circuit,
which operations are allowed to be performed by the processing circuit with each of the plurality of peripherals accessible to the processing circuit, the operations including at least one of read, write, or read and write, and
which of the plurality of states the processing circuit is allowed to transition to;
the access controller is not programmable by the processing circuit;
the plurality of rules may be changed, but cannot be changed:
by the processing circuit or
during operation of the high-security device; and
the plurality of states comprise:
an idle state;
at least one operational state capable of being transitioned to from the idle state; and
a clean-up state during which data is purged from memory, the clean-up state capable of being transitioned to by the processing circuit at least once after the processing circuit transitions from the at least one operational state and before the processing circuit transitions back to the idle state.

10. The high-security device for processing information as recited in claim 9, wherein the access controller is a programmable circuit customized during design to incorporate the plurality of rules.

11. The high-security device for processing information as recited in claim 9, wherein the high-security device processes classified information through the plurality of rules to enforce data separation between a plurality of classification levels.

12. The high-security device for processing information as recited in claim 9, wherein each peripheral is defined by an address range within address space of the processing circuit.

13. The high-security device for processing information as recited in claim 9, wherein the plurality of rules limits a first state to transitioning to a second state.

14. The high-security device for processing information as recited in claim 9, wherein the plurality of rules limits a first state from transitioning to a second state.

15. The high-security device for processing information as recited in claim 9, wherein violation of one of the plurality of rules interrupts normal operation of the processing circuit.

16. The high-security device for processing information as recited in claim 9, wherein the processing circuit communicates the next state to the access controller.

* * * * *